(12) United States Patent
Drozd (10) Patent No.: US 11,068,808 B1
(45) Date of Patent: Jul. 20, 2021

(54) SYSTEMS AND METHODS OF UTILIZING AND CREATING OPPORTUNITY GAIN FOR PERSONAL ENRICHMENT

(71) Applicant: BlueOwl, LLC, Bloomington, IL (US)

(72) Inventor: Kayla Drozd, San Francisco, CA (US)

(73) Assignee: BlueOwl, LLC, San Francisco, CA (US)

( * ) Notice: Subject to any disclaimer, the term of this patent is extended or adjusted under 35 U.S.C. 154(b) by 513 days.

(21) Appl. No.: 15/977,159

(22) Filed: May 11, 2018

Related U.S. Application Data (60) Provisional application No. 62/510,540, filed on May 24, 2017, provisional application No. 62/621,096, filed on Jan. 24, 2018.

(51) Int. Cl.
*G06Q 10/06* (2012.01)
*G06N 20/00* (2019.01)

(52) U.S. Cl.
CPC ......... *G06Q 10/0631* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 5,787,403 A * | 7/1998 | Randle | G06Q 20/00 235/380 |
| 9,773,247 B1 | 9/2017 | Keld et al. | |
| 9,782,126 B2 | 10/2017 | Surbur et al. | |
| 9,849,887 B2 | 12/2017 | Heath et al. | |
| 9,881,511 B1 | 1/2018 | Srinivasan et al. | |
| 9,954,972 B2 | 4/2018 | Asenjo et al. | |
| 2010/0268629 A1* | 10/2010 | Ross | G06Q 10/10 705/35 |
| 2012/0130727 A1* | 5/2012 | Ahmed | G06Q 30/02 705/1.1 |
| 2014/0244476 A1 | 8/2014 | Shvarts et al. | |
| 2014/0249977 A1 | 9/2014 | Kuznetsov et al. | |
| 2016/0125526 A1* | 5/2016 | Sivadasan | G06Q 20/108 705/39 |
| 2017/0024821 A1 | 1/2017 | Sherman | |
| 2017/0195994 A1* | 7/2017 | Cole | H04W 76/10 |

* cited by examiner

*Primary Examiner* — Cory W Eskridge
(74) *Attorney, Agent, or Firm* — Faegre Drinker Biddle & Reath LLP (57) ABSTRACT

A method of utilizing opportunity gain for personal enrichment of a user including receiving a selection of a personal enrichment goal (e.g., buying a vehicle or home, traveling, saving for retirement). The method also includes monitoring a routine of the user that includes an activity (e.g., daily commute, shopping, eating habits), and an amount of the personal commodity (e.g., money) is used when the user performs the activity. An average amount of the personal commodity used to perform the activity in the past is determined, and an excess amount of the personal commodity generated when the user deviates from the routine is determined. The excess amount of the personal commodity is determined as a function of the average amount and the amount of the personal commodity. The user may be notified that the excess amount of the personal commodity may be applied to achievement of the personal enrichment goal.

18 Claims, 6 Drawing Sheets

SYSTEMS AND METHODS OF UTILIZING AND CREATING OPPORTUNITY GAIN FOR PERSONAL ENRICHMENT

CROSS-REFERENCE TO RELATED APPLICATIONS

This application claims the benefit of priority to U.S. Provisional Patent Application No. 62/510,540, filed May 24, 2017, entitled "SYSTEMS AND METHODS OF UTILIZING AND CREATING OPPORTUNITY GAIN FOR PERSONAL ENRICHMENT," and U.S. Provisional Patent Application No. 62/621,096, filed Jan. 24, 2018, entitled "SYSTEMS AND METHODS OF UTILIZING AND CREATING OPPORTUNITY GAIN FOR PERSONAL ENRICHMENT," the entire contents and disclosures of which are hereby incorporated herein by reference in their entirety.

FIELD OF THE INVENTION

The present disclosure relates to data analytics and, more specifically, to systems and methods configured to enable a user to make smarter life choices such that opportunity gain derived therefrom may be used to facilitate achievement of a personal enrichment goal.

BACKGROUND

Many people follow a routine in which tasks are often performed in the same manner, in the same sequence, and/or without knowledge that other options are available for performing the tasks. As such, people often do not utilize their resources, such as time and money, in the most efficient manner. In addition, many people have a goal that requires long term planning and dedication of resources to achieve the goal. However, people may forget about the goal, may attempt to achieve the goal without careful planning, and/or may have difficulty freeing the resources needed to achieve the goal. Conventional techniques may have additional drawbacks as well.

BRIEF SUMMARY

The present embodiments may relate to systems and methods for utilizing and creating opportunity gain for personal enrichment. A tool or computer system may be provided that is capable of recognizing opportunities for creating additional resources that may be utilized to achieve a goal, and that provides means for achieving a goal using the additional resources.

In one aspect, a computer-implemented method of utilizing opportunity gain for personal enrichment of a user may be provided. The method may include, via one or more processors, receiving a selection of at least one personal enrichment goal, wherein the at least one personal enrichment goal is achieved as a function of an amount of a personal commodity dedicated to the at least one personal enrichment goal. The method may also include monitoring a routine of the user, wherein the routine includes an activity, and wherein a first amount of the personal commodity is used when the user performs the activity. An average amount of the personal commodity used to perform the activity in the past may be determined, and an excess amount of the personal commodity generated when the user deviates from the routine may be determined. The excess amount of the personal commodity may be determined as a function of the average amount and the first amount of the personal commodity. The method may further include notifying the user that the excess amount of the personal commodity may be applied to achievement of the at least one personal enrichment goal. The method may include additional, less, or alternate functionality, including that discussed elsewhere herein.

In another aspect, a computer-implemented method of proactively creating opportunity gain for a user may be provided. The method may include, via one or more processors, monitoring a routine of the user, wherein the routine may include a first activity, and wherein a first amount of a personal commodity may be used when the user performs the first activity. An average amount of the personal commodity used to perform the first activity in the past may be determined, and a deficit amount of the personal commodity if the user adheres to the routine may be determined. The deficit amount of the personal commodity may be determined as a function of the average amount and the first amount of the personal commodity. The method may further include providing a suggestion that the user deviate from the routine and perform a second activity at least one of before and instead of performing the first activity. The method may include additional, less, or alternate functionality, including that discussed elsewhere herein.

In another aspect, a computer system for utilizing opportunity gain for personal enrichment of a user may be provided. The system may include a processor and a non-transitory, tangible, computer-readable storage medium having instructions stored thereon that, in response to execution by the processor, cause the processor to perform operations including receiving a selection of at least one personal enrichment goal, wherein the at least one personal enrichment goal may be achieved as a function of an amount of a personal commodity dedicated to the at least one personal enrichment goal. The processor may also monitor a routine of the user, wherein the routine may include an activity, and wherein a first amount of the personal commodity may be used when the user performs the activity. An average amount of the personal commodity used to perform the activity in the past may be determined, and an excess amount of the personal commodity generated when the user deviates from the routine may be determined. The excess amount of the personal commodity may be determined as a function of the average amount and the first amount of the personal commodity. The processor may also notify the user that the excess amount of the personal commodity may be applied to achievement of the at least one personal enrichment goal. The system may include additional, less, or alternate functionality, including that discussed elsewhere herein.

In yet another aspect, at least one non-transitory computer-readable storage media or medium having computer-executable instructions embodied thereon may be provided. When executed by at least one processor, the computer-executable instructions cause the processor to receive a selection of at least one personal enrichment goal, wherein the at least one personal enrichment goal may be achieved as a function of an amount of a personal commodity dedicated to the at least one personal enrichment goal. The processor may also monitor a routine of the user, wherein the routine may include an activity, and wherein a first amount of the personal commodity may be used when the user performs the activity. An average amount of the personal commodity used to perform the activity in the past may be determined, and an excess amount of the personal commodity generated when the user deviates from the routine may be determined. The excess amount of the personal commodity may be determined as a function of the average amount and the first amount of the personal commodity. The processor may also notify the user that the excess amount of the personal commodity may be applied to achievement of the at least one personal enrichment goal. The media or medium may store instructions that direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for utilizing and creating opportunity gain for personal enrichment of a user. In one exemplary embodiment, the methods may be performed by a computer network that may include a client computer device and a server computer device.

In the exemplary embodiment, the client computer device may receive a selection of at least one personal enrichment goal for the user. The at least one personal enrichment goal is achieved as a function of an amount of a personal commodity dedicated to the personal enrichment goal. The personal commodity may include time and money. Example personal enrichment goals may include learning a new skill, a new language, or gaining knowledge, which require time to achieve, or saving money, such as to facilitate a purchase, increasing retirement savings, paying for a wedding or anniversary party, paying for a vacation or a new vehicle, etc.

In the exemplary embodiment, the client computer device may monitor a routine of the user. The routine may include an activity, and a first amount of the personal commodity may be used when the user performs the activity. Exemplary activities may include commuting from one destination to another, shopping, or participating in a social activity.

The client computer device or the server computer device may then determine an average amount of the personal commodity used to perform the activity in the past, and determine an excess amount of the personal commodity generated when the user deviates from the routine. For example, in some embodiments, the user may generate additional time when choosing to take an alternative route when traveling between two locations.

In one embodiment, the client computer device may notify the user that the excess amount of the personal commodity may be applied to achievement of the personal enrichment goal. As such, the user is reminded that he/she had previously indicated interest in achieving a goal, and is notified that additional resources have been generated that may now be used to achieve the goal.

In some embodiments, means for achieving the personal enrichment goal is provided to the user. For example, means for achieving the personal enrichment goal may include an application that is installed on the client computer device, where the application may be launched automatically when an excess amount of the personal commodity is generated. The application may facilitate achievement of the personal enrichment goal by at least one of: (1) providing educational material to the user when the personal achievement goal is to gain skills or knowledge; (2) facilitating the transference of money between a bank account and a deposit account associated with the user; and/or (3) connecting the user to a third party site configured to offer at least one of a product or a service associated with the at least one personal enrichment goal.

In another embodiment, the client computer device may monitor a routine of the user. The routine may include a first activity, and a first amount of a personal commodity is used when the user performs the activity.

The client computer device or the server computer device may then determine an average amount of the personal commodity used to perform the activity in the past, and determine a deficit amount of the personal commodity if the user adheres to the routine. The deficit amount of the personal commodity may be determined as a function of the average amount and the first amount of the personal commodity.

In the exemplary embodiment, the client computer device may then provide a suggestion that the user deviate from the routine and perform a second activity at least one of before or instead of performing the first activity. For example, the client computer device may monitor the normal commute of the user and, in the event there is excessive traffic on the user's routine commute, determine that the time lost if the user performed her normal commute may instead be used to accomplish a task, for example. More specifically, the client computer device may suggest that the user perform tasks such as, but not limited to, running an errand or going to the gym instead of going directly home after work. Alternatively, the client computer device may monitor the spending habits of the user, including where the user normally shops, and suggest that the user shop elsewhere to save money.

At least one of the technical problems solutions provided by this system may include: (i) facilitating recognition and creation of opportunity gain for a user by either recognizing when the user deviates from a normal routine, or suggesting the user deviate from the normal routine; (ii) enabling the user to utilize the opportunity gain for achievement of a personal enrichment goal; (iii) providing means for achieving the personal enrichment goal; and/or (iv) connecting the user to a third party that offers at least one of products or services that may be used to provide a secondary benefit to the user other than achievement of the personal enrichment goal.

The methods and systems described herein may be implemented using computer programming or engineering techniques including computer software, firmware, hardware, or any combination or subset thereof, wherein the technical effects may be achieved by performing at least one of the following steps: (i) receiving a selection of at least one personal enrichment goal, wherein the at least one personal enrichment goal is achieved as a function of an amount of a personal commodity dedicated to the at least one personal enrichment goal; (ii) monitoring a routine of the user, wherein the routine includes an activity, and wherein a first amount of the personal commodity is used when the user performs the activity; (iii) determining an average amount of the personal commodity used to perform the activity in the past; (iv) determining an excess amount of the personal commodity generated when the user deviates from the routine, wherein the excess amount of the personal commodity is determined as a function of the average amount and the first amount of the personal commodity; and/or (v) notifying the user that the excess amount of the personal commodity may be applied to achievement of the at least one personal enrichment goal.

Figure 1:
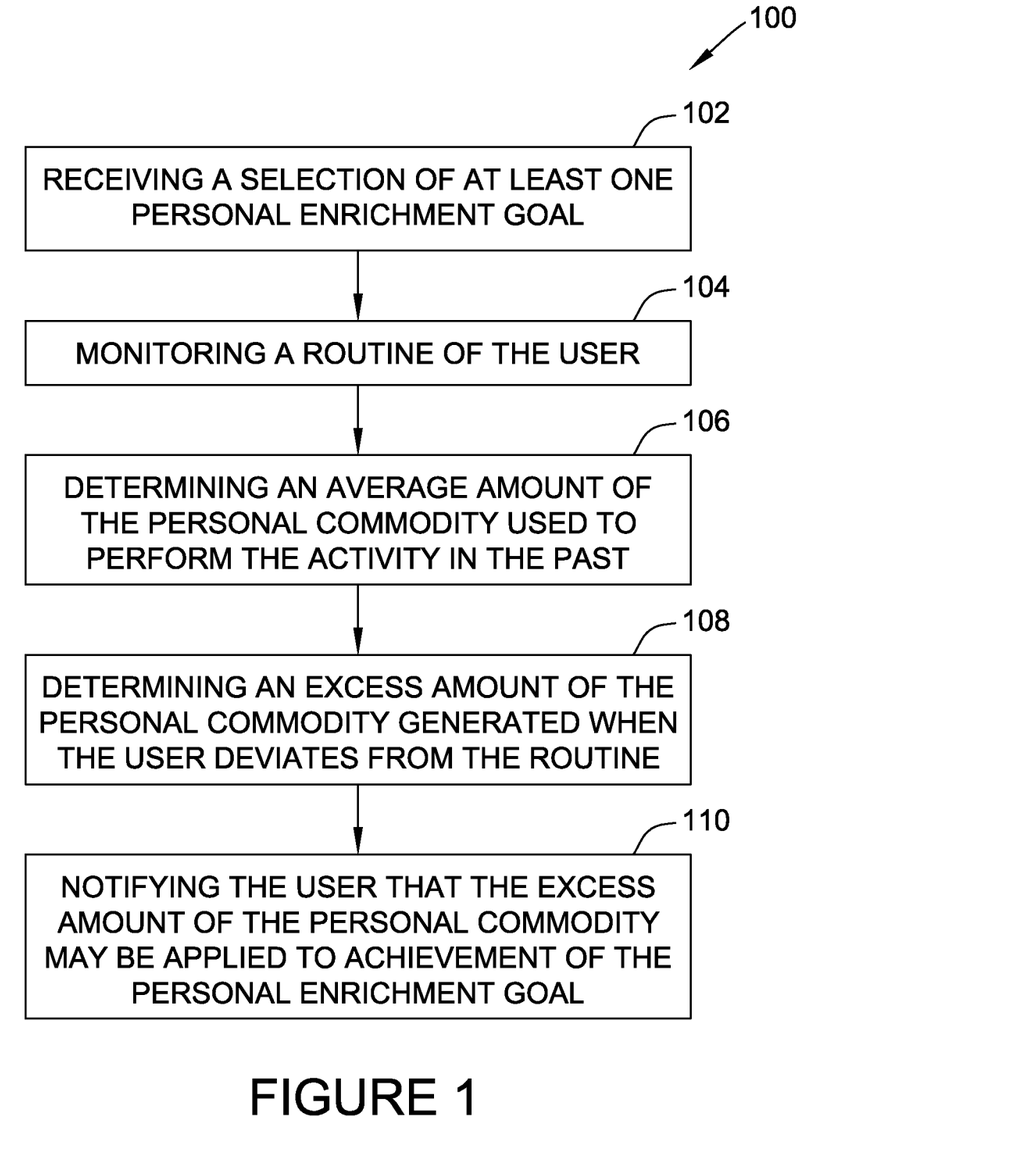
FIG. 1 is a flow diagram illustrating an exemplary process of utilizing opportunity gain for personal enrichment of a user.

Exemplary Process for Utilizing Opportunity Gain for Personal Enrichment of a User FIG. 1 is a flow diagram illustrating an exemplary process 100 of utilizing opportunity gain for personal enrichment of a user. Process 100 may be implemented by a computing device such as, for example, a client computer device and/or a server computer device, as will be explained in more detail below.

In the exemplary embodiment, the client computer device may receive 102 a selection of at least one personal enrichment goal from a user. The personal enrichment goal may include learning a new skill or gaining knowledge (e.g., learning a new language), or saving money for a purchase or for retirement. The at least one personal enrichment goal is achieved as a function of an amount of a personal commodity dedicated to the at least one personal enrichment goal. Example personal commodities may include time and money.

In the exemplary embodiment, the client computer device may also monitor 104 a routine of the user. The routine may include an activity, and a first amount of the personal commodity may be used when the user performs the activity. In one embodiment, the client computer device may monitor a commute of the user from a first destination to a second destination (e.g., the commute of the user between work and home). The client computer device may monitor a route that the user takes to commute from the first destination to the second destination, and may also monitor the amount of time it takes for the user to commute from the first destination to the second destination. For example, in one embodiment, the client computer device is a user device, and global position system (GPS) data associated with the user device is accessed when monitoring the route taken by the user.

In the exemplary embodiment, the client device and/or the server computer device may determine 106 an average amount of the personal commodity used to perform the activity in the past. The average amount may be determined based upon one or more occurrences of the user performing the activity. In one embodiment, the device may determine the average time it takes for the user to commute from the first destination to the second destination.

In the exemplary embodiment, the client computer device and/or the server computer device may determine 108 an excess amount of the personal commodity generated when the user deviates from the routine. The excess amount of the personal commodity may be determined as a function of the average amount and the first amount of the personal commodity. For example, in one embodiment, the excess amount of the personal commodity may be determined based upon a difference between the average amount and the first amount of the personal commodity. In addition, the device may determine the difference between the average amount and the first amount of the personal commodity after the user completes the activity. In one embodiment, the device may determine an excess amount of time generated when the user deviates from her routine commute in at least one of route taken and/or duration. For example, the device may determine the time it takes for the user to commute from the first destination to the second destination on a given day, and may log the commute time after the user arrives at the second destination. The device may then determine the excess amount of time generated based upon a difference between the average commute time and the commute time (e.g., the first amount of the personal commodity). The excess amount of time may be applied to achievement of the personal enrichment goal selected by the user.

In the exemplary embodiment, the client computer device notifies 110 the user that the excess amount of the personal commodity may be applied to achievement of the personal enrichment goal. In one embodiment, the user is notified by displaying, on a user device (e.g., the client computer device), a graphical representation of the excess amount of the personal commodity. For example, in one embodiment, the user is notified that an excess amount of time has been generated after the user reaches her desired destination (e.g., the second destination). A media output of the client computer device may be activated automatically such that the user may be immediately notified that an excess amount of time has been generated, which may then be applied to achievement of a selected personal enrichment goal. In addition, in one embodiment, the user may be notified that an excess amount of the personal commodity has been generated, and the user has the option to utilize the excess amount of the personal commodity at all, and/or in any manner she sees fit.

In some embodiments, the client computer device and/or the server computer device may provide means for achieving the personal enrichment goal to the user. For example, the device may automatically launch an application that may facilitate achievement of the personal enrichment goal upon determining that an excess amount of the personal commodity has been generated. For example, if a personal enrichment goal selected is to learn to a new skill or gain knowledge, the device may launch an application that may provide educational material to the user. In one embodiment, the application launched may be an application provided and serviced by a third party. For example, if the personal enrichment goal selected is to learn a new language, the device may launch third party application designed to teach the user the new language. If the personal enrichment goal is to gain knowledge and/or to become knowledgeable on a specified topic, the application launched may facilitate connecting the user to educational material on the specified topic. For example, the application may connect the user to educational material such as news articles and/or websites relevant to the specified topic.

The application may also connect the user to a third party site that may offer at least one of a product or a service associated with the personal enrichment goal. For example, in the exemplary embodiment, the application may display the product or the service offered by the third party site, and may also display a user-selectable link to the third party site. The application may then receive a selection of the user-selectable link such that the user is redirected to the third party site. In one embodiment, if the personal enrichment goal is to gain knowledge and/or to become knowledgeable on a specified topic, the application may redirect the user to a website that offers books on the specified topic.

In some embodiments, the personal enrichment goal selected may be to save money for a purchase, such as for a house or a vehicle, and/or or for retirement, for example. In one embodiment, the client computer device and/or the server computer device may monitor the spending habits of the user. The device may monitor the spending habits of the user by accessing financial transaction data from at least one of a bank account or a credit card account associated with the user. Based upon the financial transaction data, the device may determine how much money the user spends over the course of a predetermined time interval, how much money the user spends at a store (e.g., grocery stores and retail stores), and/or how much money the user spends on a particular good or service.

For example, based upon the financial transaction data, the device may determine that the user spends a first amount of money on a product (e.g., coffee) on a monthly basis, on average. If the device determines that the user saved money by spending less on the product in a given month, the user may be notified that an excess amount of money has been generated. For example, a media output of the client computer device may be activated automatically such that the user may be immediately notified that an excess amount of money has been generated, which may then be applied to achievement of a selected personal enrichment goal.

In one embodiment, the user may input a budget for a specified time period into the application, and the excess amount of money may be determined as a function of a difference between the budget and the actual expenditure amount.

Moreover, in one embodiment, the device may be capable of determining when the user abstains from a normal and/or planned activity, and may determine an excess amount of money generated based upon a difference between the average amount of money typically spent on the activity and the amount of money saved by abstaining from the activity.

As noted above, the client computer device and/or the server computer device may provide means for achieving the personal enrichment goal (e.g., saving money) to the user. For example, the device may automatically launch an application that may facilitate achievement of the personal enrichment goal upon determining that an excess amount of the personal commodity has been generated. In one embodiment, the application may be linked to a bank account and a deposit account associated with the user. The deposit account may be a savings account, a checking account, and/or a retirement fund (e.g., a 401(k) account). The application may display a graphical representation of the excess amount of money generated by deviating from the normal and/or planned activity, and may also receive authorization to transfer the excess amount of money from the bank account to the deposit account. When saving for retirement, the application may also display a projected return at a future date if the excess amount of money is invested.

Moreover, as noted above, the application may also connect the user to a third party site that may offer at least one of a product or a service associated with the personal enrichment goal. For example, if the personal enrichment goal selected is to save money to purchase a vehicle or a home, the application may provide the user with insurance rate quotes from an insurance provider and/or loan rate quotes from a banking institution.

Exemplary Process for Proactively Creating Opportunity Gain for a User

Figure 2:
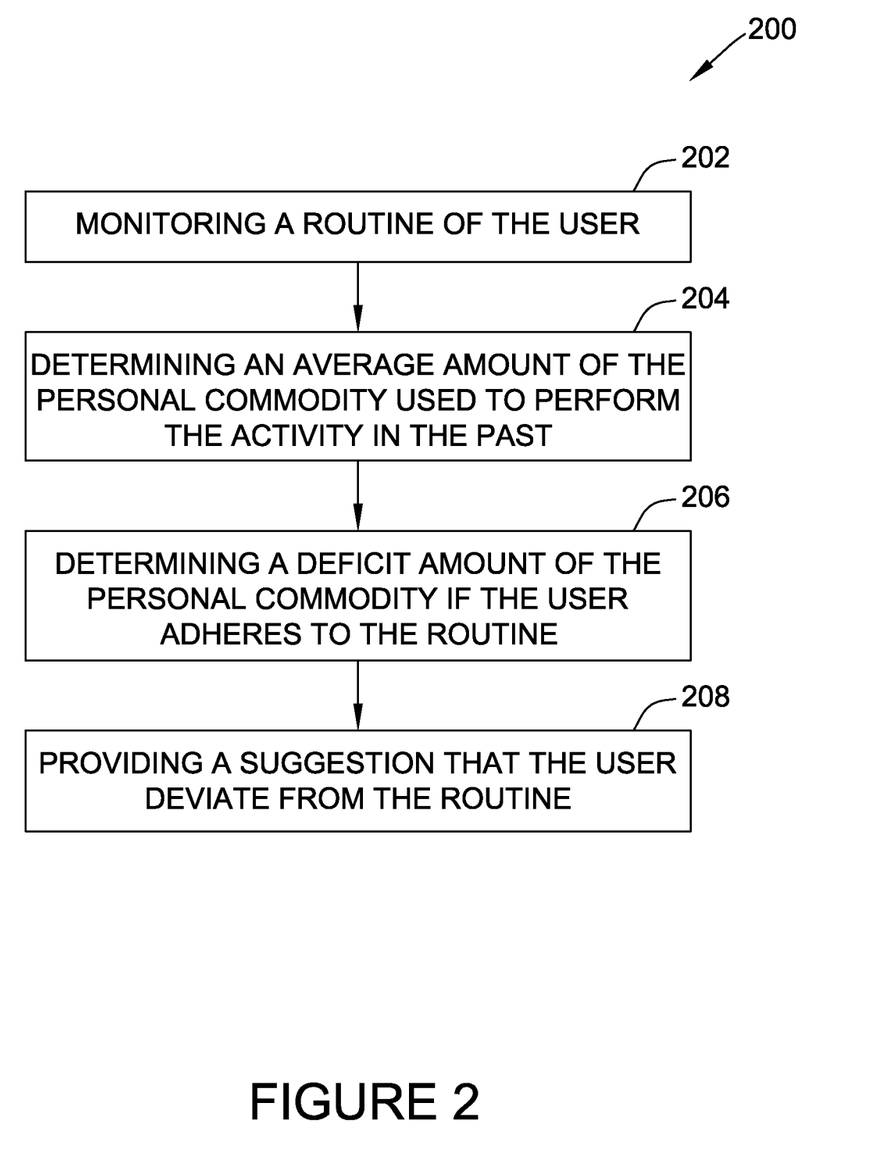
FIG. 2 is a flow diagram illustrating an exemplary process of proactively creating opportunity gain for a user.

FIG. 2 is a flow diagram illustrating an exemplary process 200 of proactively creating opportunity gain for a user. Process 200 may be implemented by a computing device such as, for example, a client computer device and/or a server computer device, as will be explained in more detail below.

In the exemplary embodiment, the client computer device may monitor 202 a routine of the user. The routine may include a first activity, and a first amount of the personal commodity may be used when the user performs the activity. In one embodiment, the client computer device may monitor a commute of the user from a first destination to a second destination (e.g., the commute of the user between work and home). The client computer device and/or the server computer device may then determine 204 an average amount of the personal commodity used to perform the first activity in the past.

In the exemplary embodiment, the client computer device and/or the server computer device may determine 206 a deficit amount of the personal commodity if the user adheres to her normal routine. The deficit amount of the personal commodity may be determined as a function of the average amount and the first amount of the personal commodity. For example, when monitoring the commute of the user, the device may determine that an excessive amount of traffic on the route the user normally takes to reach the second destination will increase her commute time, and the deficit amount of the personal commodity may be determined based upon a difference between an average commute time and a projected commute time with the excessive amount of traffic.

In the exemplary embodiment, the client computer device and/or the server computer device may provide 208 a suggestion that the user deviate from the routine and perform a second activity at least one of before or instead of performing the first activity. For example, in one embodiment, the device may suggest that the user commute from the first destination to a third destination before commuting to the second destination. The user may perform a task at the third destination (e.g., running an errand). In one embodiment, the device may access a task list associated with the user and having at least one input stored therein. The device may provide the suggestion to commute to the third destination before the second destination based upon the tasks included in the task list. As such, the user may save time by changing the sequence of her routine and performing the task at the third destination and then commuting to the second destination, rather than commuting to the second destination per the routine and then performing the task. For example, the third destination may be en route to the second destination.

In one embodiment, the client computer device may receive a selection of at least one personal enrichment goal for the user by the user. The personal enrichment goal may be achievable by performing the task at the third destination. The personal enrichment goal selections may be stored in the device, and the device may provide the suggestion based upon the personal enrichment goals selected. For example, the personal enrichment goal selected may be to go to the gym a certain number of times a week. As such, the device may provide the suggestion that the user commute to the gym instead of commuting home if an excessive amount of traffic is on the route routinely taken.

In one embodiment, the client computer device and/or the server computer device may monitor the spending habits of the user, and may provide suggestions that the user change her spending habits to facilitate saving money. For example, the device may monitor the spending habits of the user at a first store, and may provide a suggestion that the user shop at a second store instead of the first store when the price of goods or services is lower at the second store than the first store. The device may determine a difference in the price of goods at the first store and the second store by accessing an itemized list of goods populated by the user. In one embodiment, the itemized list of goods may include a grocery list. The device may access pricing data for the goods on the itemized list, and/or may determine when there is a sale for goods on the itemized list at the second store. The device may provide the suggestion that the user shop at the second store when a total cost of the goods on the itemized list is less at the second store than at the first store.

Exemplary Computer Network

Figure 3:
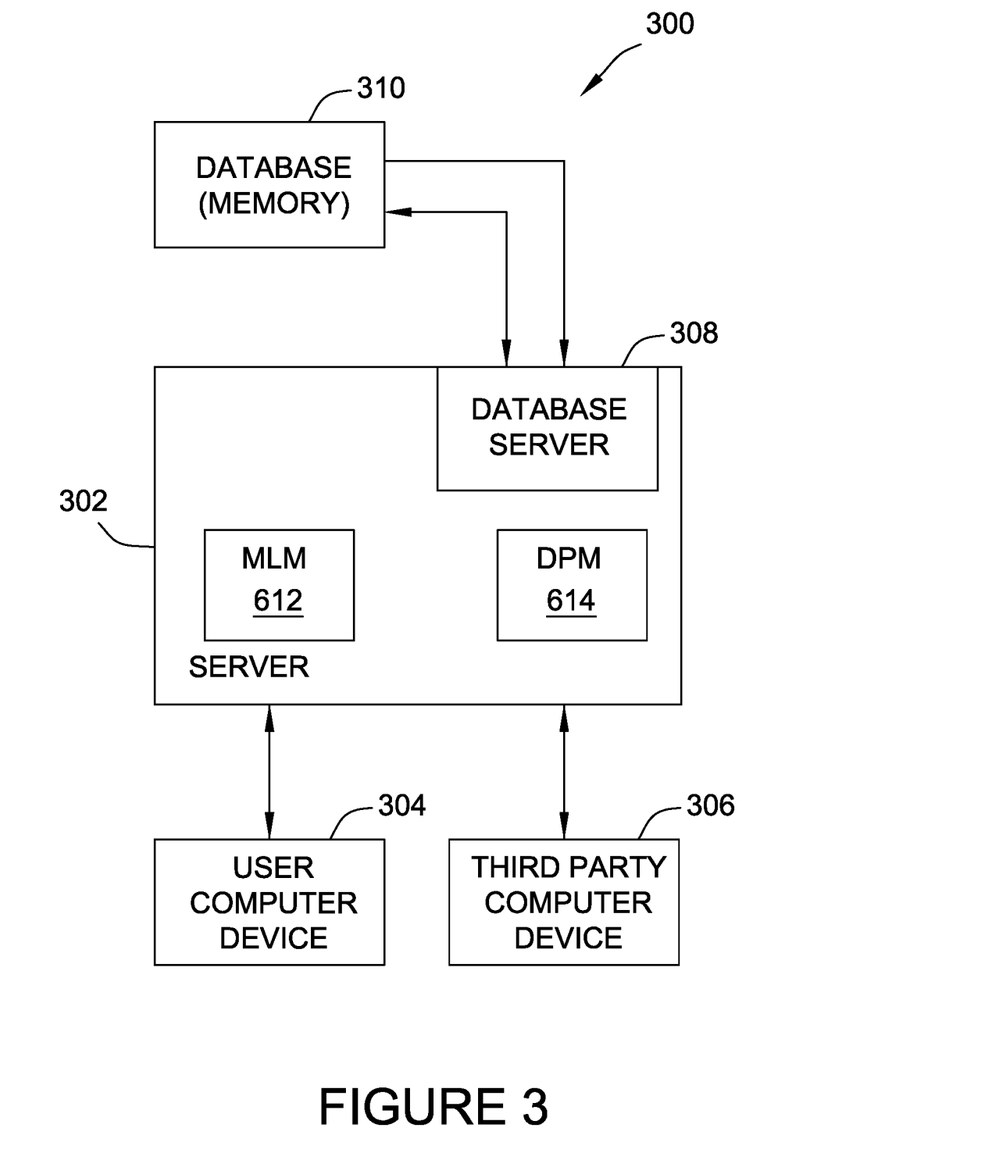
FIG. 3 is a block diagram illustrating an exemplary computer network that may be used to utilize and create opportunity gain for a user.

FIG. 3 illustrates a block diagram of an exemplary system or computer network 300 for implementing process 100 (shown in FIG. 1) and/or process 200 (shown in FIG. 2). In the exemplary embodiment, computer network 300 may be used to utilize and create opportunity gain for a user. Computer network 300 includes a server 302, a user computer device 304 in communication with server 302, and a third party computer device 306 in communication with server 302. As will be described in further detail below, computer network 300 may be configured to, in a first embodiment of the disclosure, (i) receive a selection of at least one personal enrichment goal, wherein the at least one personal enrichment goal may be achieved as a function of an amount of a personal commodity dedicated to the at least one personal enrichment goal; (ii) monitor a routine of the user, wherein the routine includes an activity, and wherein a first amount of the personal commodity is used when the user performs the activity; (iii) determine an average amount of the personal commodity used to perform the activity in the past; (iv) determine an excess amount of the personal commodity generated when the user deviates from the routine, wherein the excess amount of the personal commodity is determined as a function of the average amount and the first amount of the personal commodity; and/or (v) notify the user that the excess amount of the personal commodity may be applied to achievement of the at least one personal enrichment goal.

Computer network 300 may also be configured to, in a second embodiment of the disclosure, (i) monitoring a routine of the user, wherein the routine includes a first activity, and wherein a first amount of a personal commodity is used when the user performs the first activity; (ii) determining an average amount of the personal commodity used to perform the first activity in the past; (iii) determining a deficit amount of the personal commodity if the user adheres to the routine, wherein the deficit amount of the personal commodity is determined as a function of the average amount and the first amount of the personal commodity; (iv) determine an excess amount of the personal commodity generated when the user deviates from the routine, wherein the excess amount of the personal commodity is determined as a function of the average amount and the first amount of the personal commodity; and/or (v) notify the user that the excess amount of the personal commodity may be applied to achievement of the at least one personal enrichment goal.

In the exemplary embodiment, user computer device 304 may be a computer that includes a web browser or a software application, which enables user computer device 304 to access remote computer devices, such as server 302, using the Internet or other network. More specifically, user computer device 304 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer device 304 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 308 may be communicatively coupled to a database 310 that stores data. In one embodiment, database 310 may store a user profile, including a list of personal enrichment goals selected by a user, historical user data associated with a user's routine, login credentials for one or more accounts associated with a user when accessing the accounts through third party computer device 306, and/or one or more rules for performing the processes described herein. In the exemplary embodiment, database 310 may be stored remotely from server 302. In some embodiments, database 310 may be decentralized.

Figure 5:
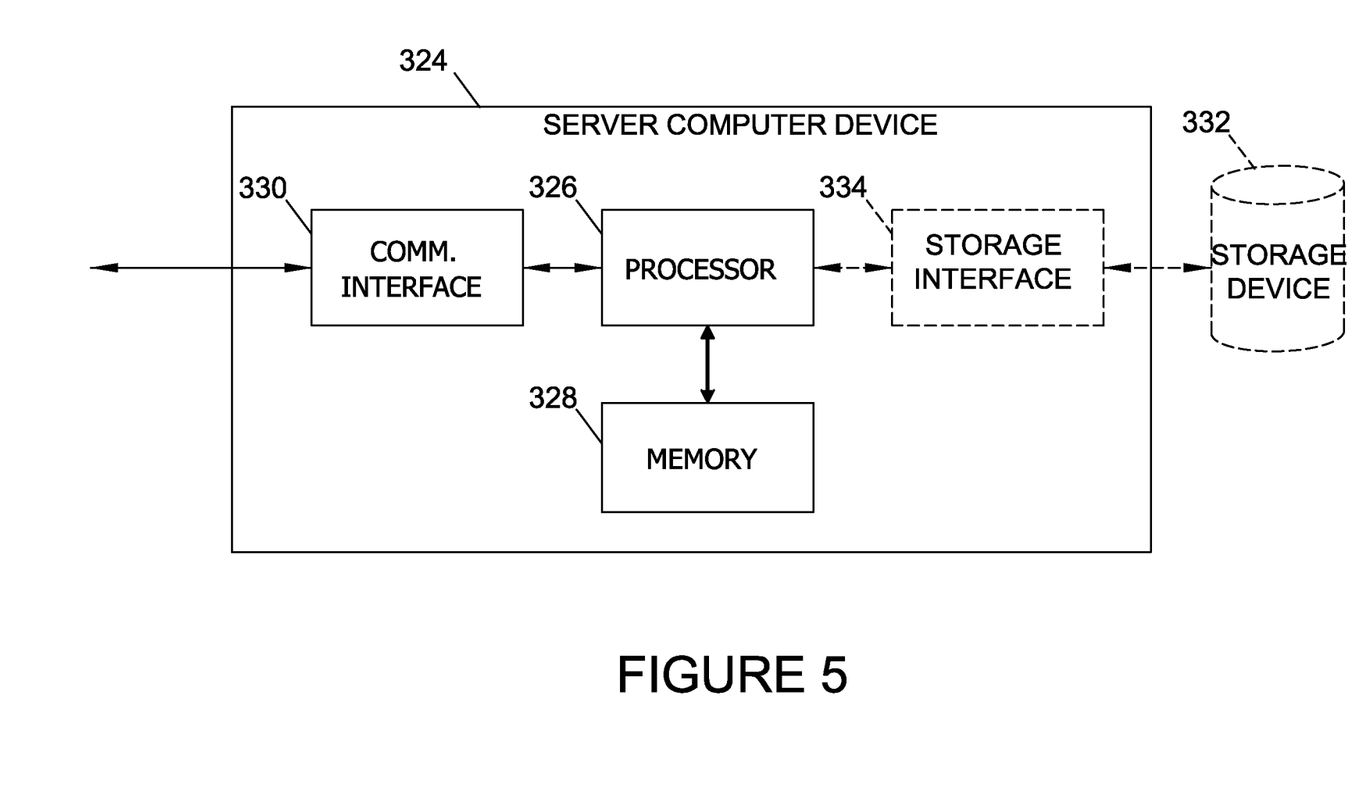
FIG. 5 is a block diagram illustrating an exemplary server computer device, in accordance with one embodiment of the present disclosure.

In the exemplary embodiment, server 302 may include machine learning module ("MLM") 612. In one embodiment, MLM 612 may include a software subroutine stored in memory 328 and executable by processor 326 (as shown in FIG. 5). In another embodiment MLM 612 may include a machine learning co-processor and/or graphics processor communicatively coupled to processor 326 and memory 328. Server 302 may further include data processing module ("DPM") 614 configured to receive data from any combination of database 310, third party computer device 306, and/or user computer device 304. For example, DPM 614 may queue messages received from third party computer device 306, and provide batched and/or aggregated data to MLM 612.

Exemplary User Computer Device

Figure 4:
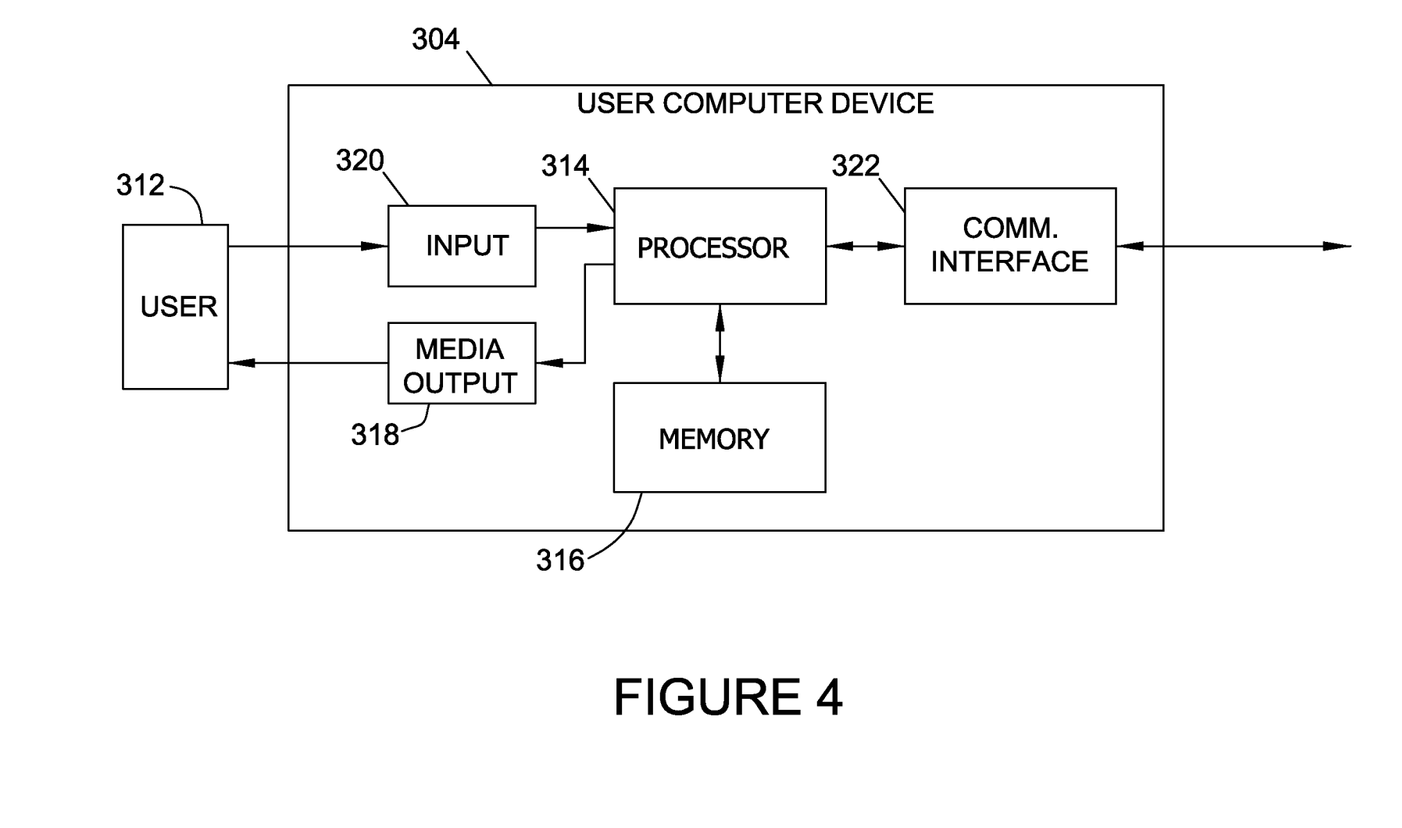
FIG. 4 is a block diagram illustrating an exemplary user computer device, in accordance with one embodiment of the present disclosure.

FIG. 4 depicts an exemplary configuration of user computer device 304, in accordance with one embodiment of the present disclosure. User computer device 304 may be operated by a user 312. User computer device 304 may include a processor 314 for executing instructions. In some embodiments, executable instructions may be stored in a memory area 316. Processor 314 may include one or more processing units (e.g., in a multi-core configuration). Memory area 316 may be any device allowing information such as executable instructions and/or transaction data to be stored and retrieved. Memory area 316 may include one or more computer readable media.

User computer device 304 may also include at least one media output component 318 for presenting information to user 312. Media output component 318 may be any component capable of conveying information to user 312. In some embodiments, media output component 318 may include an output adapter (not shown) such as a video adapter and/or an audio adapter. An output adapter may be operatively coupled to processor 314 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 318 may be configured to present a graphical user interface (e.g., a web browser and/or a client application) to user 312. A graphical user interface may include, for example, an interface for an application installed on user computer device 304 for displaying notifications and suggestions for utilizing and creating opportunity gain, as described herein. In some embodiments, user computer device 304 may include an input device 320 for receiving input from user 312. User 312 may use input device 320 to, without limitation, select personal enrichment goals and utilize tools that facilitate achievement of the personal enrichment goals.

Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 318 and input device 320.

User computer device 304 may also include a communication interface 322, communicatively coupled to a remote device such as server 302 (shown in FIG. 3). Communication interface 322 may include, for example, a wired or wireless network adapter and/or a wireless data transceiver for use with a mobile telecommunications network.

Stored in memory area 316 are, for example, computer readable instructions for providing a user interface to user 312 via media output component 318 and, optionally, receiving and processing input from input device 320. A user interface may include, among other possibilities, a web browser and/or a client application. Web browsers enable users, such as user 312, to display and interact with media and other information typically embedded on a web page or a website from server 302. A client application may allow user 312 to interact with, for example, server 302.

Exemplary Server Computer Device

FIG. 5 is a block diagram illustrating exemplary server computer device 324, in accordance with one embodiment of the present disclosure. Server computer device 324 may include, but is not limited to, server 302 and database server 308 (both shown in FIG. 3). Server computer device 324 may also include a processor 326 for executing instructions. Instructions may be stored in a memory area 328. Processor 326 may include one or more processing units (e.g., in a multi-core configuration).

Processor 326 may be operatively coupled to a communication interface 330 such that server computer device 324 is capable of communicating with a remote device such as another server computer device 324, server 302, and user computer device 304 (for example, using wireless communication or data transmission over one or more radio links or digital communication channels). For example, communication interface 330 may receive requests from user computer device 304 via the Internet, as described above.

Processor 326 may also be operatively coupled to a storage device 332. Storage device 332 may be any computer-operated hardware suitable for storing and/or retrieving data, such as, but not limited to, data associated with database 310 (shown in FIG. 3). In some embodiments, storage device 332 may be integrated in server computer device 324. For example, server computer device 324 may include one or more hard disk drives as storage device 332.

In other embodiments, storage device 332 may be external to server computer device 324 and may be accessed by a plurality of server computer devices 324. For example, storage device 332 may include a storage area network (SAN), a network attached storage (NAS) system, and/or multiple storage units such as hard disks and/or solid state disks in a redundant array of inexpensive disks (RAID) configuration.

In some embodiments, processor 326 may be operatively coupled to storage device 332 via a storage interface 334. Storage interface 334 may be any component capable of providing processor 326 with access to storage device 332. Storage interface 334 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 326 with access to storage device 332.

Processor 326 may execute computer-executable instructions for implementing aspects of the disclosure. In some embodiments, the processor 326 may be transformed into a special purpose microprocessor by executing computer-executable instructions or by otherwise being programmed. For example, the processor 326 may be programmed with instructions, such as those illustrated in FIG. 1 and FIG. 2.

Exemplary Embodiments & Functionality

In one aspect, a computer system for utilizing and creating opportunity gain for personal enrichment of a user may be provided. The computer system may include at least one processor in communication with at least one memory device. The at least one processor may be configured or programmed to: (i) receive a selection of at least one personal enrichment goal, wherein the at least one personal enrichment goal is achieved as a function of an amount of a personal commodity dedicated to the at least one personal enrichment goal; (ii) monitor a routine of the user, wherein the routine includes an activity, and wherein a first amount of the personal commodity is used when the user performs the activity; (iii) determine an average amount of the personal commodity used to perform the activity in the past; (iv) determine an excess amount of the personal commodity generated when the user deviates from the routine, wherein the excess amount of the personal commodity is determined as a function of the average amount and the first amount of the personal commodity; and/or (v) notify the user that the excess amount of the personal commodity may be applied to achievement of the at least one personal enrichment goal.

In another aspect, a computer system for creating opportunity gain for a user may be provided. The computer system may include at least one processor in communication with at least one memory device. The at least one processor may be configured or programmed to: (i) monitoring a routine of the user, wherein the routine includes a first activity, and wherein a first amount of a personal commodity is used when the user performs the first activity; (ii) determining an average amount of the personal commodity used to perform the first activity in the past; (iii) determining a deficit amount of the personal commodity if the user adheres to the routine, wherein the deficit amount of the personal commodity is determined as a function of the average amount and the first amount of the personal commodity; (iv) determine an excess amount of the personal commodity generated when the user deviates from the routine, wherein the excess amount of the personal commodity is determined as a function of the average amount and the first amount of the personal commodity; and/or (v) notify the user that the excess amount of the personal commodity may be applied to achievement of the at least one personal enrichment goal. The foregoing systems may include additional, less, or alternate functionality, including that discussed elsewhere herein.

In one aspect, a computer-implemented method of proactively creating opportunity gain for a user may be provided. The method may include, via one or more processors and/or associated transceivers, (i) monitoring a routine of the user, wherein the routine includes a first activity, and wherein a first amount of a personal commodity is used when the user performs the first activity; (ii) determining an average amount of the personal commodity used to perform the first activity in the past; (iii) determining a deficit amount of the personal commodity if the user adheres to the routine, wherein the deficit amount of the personal commodity is determined as a function of the average amount and the first amount of the personal commodity; and (iv) providing a suggestion that the user deviate from the routine and perform a second activity at least one of before or instead of performing the first activity.

In some embodiments, monitoring a routine of the user may include monitoring a commute of the user from a first destination to a second destination, wherein the personal commodity is time. In some embodiments, providing a suggestion may include providing the suggestion that the user commute from the first destination to a third destination before commuting to the second destination, wherein the user performs a task at the third destination. In some embodiments, the method may further include receiving a selection of at least one personal enrichment goal for the user, wherein the personal enrichment goal is achievable by performing the task. In other embodiments, the method may further include accessing a task list associated with the user and having at least one input stored therein, wherein the suggestion to commute to the third destination is determined based upon the task included from the task list.

In some embodiments, monitoring a routine of the user may include monitoring spending habits of the user at a first store, wherein the personal commodity is money. In some embodiments, providing a suggestion may include providing the suggestion that the user shop at a second store, instead of the first store, when the price of at least one of goods or services is lower at the second store than the first store. In some embodiments, providing the suggestion may include (a) accessing an itemized list of goods populated by the user; and (b) providing the suggestion that the user shop at the second store when a total cost of the goods on the itemized list is less at the second store than at the first store.

In another aspect, at least one non-transitory computer-readable storage media having computer-executable instructions embodied thereon may be provided. When executed by at least one processor, the computer-executable instructions may cause the processor to: (i) receive a selection of at least one personal enrichment goal, wherein the at least one personal enrichment goal is achieved as a function of an amount of a personal commodity dedicated to the at least one personal enrichment goal; (ii) monitor a routine of the user, wherein the routine includes an activity, and wherein a first amount of the personal commodity is used when the user performs the activity; (iii) determine an average amount of the personal commodity used to perform the activity in the past; (iv) determine an excess amount of the personal commodity generated when the user deviates from the routine, wherein the excess amount of the personal commodity is determined as a function of the average amount and the first amount of the personal commodity; and/or (v) notify the user that the excess amount of the personal commodity may be applied to achievement of the at least one personal enrichment goal.

In a further aspect, a computer-implemented method of utilizing opportunity gain for personal enrichment of a user may be provided. The method may include, via one or more processors and/or associated transceivers, (i) receiving a selection of at least one personal enrichment goal, wherein the at least one personal enrichment goal is achieved as a function of an amount of money dedicated to the at least one personal enrichment goal; (ii) monitoring a routine of the user, wherein the routine includes an activity (such as a daily commute, dining or restaurant habits, shopping habits, disposal income spending habits, etc.), and wherein a first amount of money is used when the user performs the activity; (iii) determining an average amount of money used to perform the activity in the past; (iv) determining an excess amount of money generated when the user deviates from the routine, wherein the excess amount of money is determined as a function of the average amount and the first amount of money; and/or (v) notifying the user that the excess amount of money may be applied to achievement of the at least one personal enrichment goal.

In some embodiments, the method may include: (a) displaying, in an application, an excess amount of money generated by deviating from the activity, wherein the application is linked to a bank account and a deposit account associated with the user; and/or (b) receiving, via the application, authorization to transfer the excess amount of money from the bank account to the deposit account. In other embodiments, at least one personal enrichment goal may include at least one of gaining knowledge or saving money.

In a further aspect, a computer-implemented method of proactively creating opportunity gain for a user may be provided. The method may include, via one or more processors and/or associated transceivers: (i) monitoring a routine of the user, wherein the routine includes a first activity (such as a daily commute, shopping habits, eating habits, spending habits, etc.), and wherein a first amount of money is used when the user performs the first activity; (ii) determining an average amount of money used to perform the first activity in the past; (iii) determining a deficit amount of money if the user adheres to the routine, wherein the deficit amount of money is determined as a function of the average amount and the first amount of money; and/or (iv) providing a suggestion that the user deviate from the routine and perform a second activity at least one of before or instead of performing the first activity.

In a still further aspect, a computer system for utilizing opportunity gain for personal enrichment of a user may be provided. The system may include a processor; and a non-transitory, tangible, computer-readable storage medium having instructions stored thereon that, in response to execution by the processor, cause the processor to perform operations including: (i) receiving a selection of at least one personal enrichment goal, wherein the at least one personal enrichment goal is achieved as a function of an amount of money dedicated to the at least one personal enrichment goal; (ii) monitoring a routine of the user, wherein the routine includes an activity (such as a daily commute, travel activity, spending or shopping habits, etc.), and wherein a first amount of money is used when the user performs the activity; (iii) determining an average amount of money used to perform the activity in the past; (iv) determining an excess amount of money generated when the user deviates from the routine, wherein the excess amount of money is determined as a function of the average amount and the first amount of money; and/or (v) notifying the user that the excess amount of money may be applied to achievement of the at least one personal enrichment goal.

In one aspect, at least one non-transitory computer-readable storage media having computer-executable instructions embodied thereon may be provided. When executed by at least one processor, the computer-executable instructions may cause the processor to: (i) receive a selection of at least one personal enrichment goal, wherein the at least one personal enrichment goal is achieved as a function of an amount of money dedicated to the at least one personal enrichment goal; (ii) monitor a routine of the user, wherein the routine includes an activity, and wherein a first amount of money is used when the user performs the activity; (iii) determine an average amount of money used to perform the activity in the past; (iv) determine an excess amount of money generated when the user deviates from the routine, wherein the excess amount of money is determined as a function of the average amount and the first amount of money; and/or (v) notify the user that the excess amount of money may be applied to achievement of the at least one personal enrichment goal.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, re-inforced or reinforcement learning, and/or other types of machine learning and/or artificial intelligence.

In supervised machine learning, a processing element (such as machine learning module 612 shown in FIG. 6) may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, driver and/or vehicle, home owner and/or home, buyer, geolocation information, image data, home sensor data, the user's routine, and/or other data.

Based upon these analyses, the processing element may learn how to identify characteristics and patterns that may then be applied to analyzing sensor data, authentication data, image data, mobile device data, and/or other data. For example, the processing element may learn, with the user's permission or affirmative consent, to predict suggestions for offers to present to user based upon the user's previously stated goals and/or offers that processing device may switch to without specifically requesting permission from the user. The processing element may also learn how to identify different types of routines and opportunities to save portions of the personal commodity.

Figure 6:
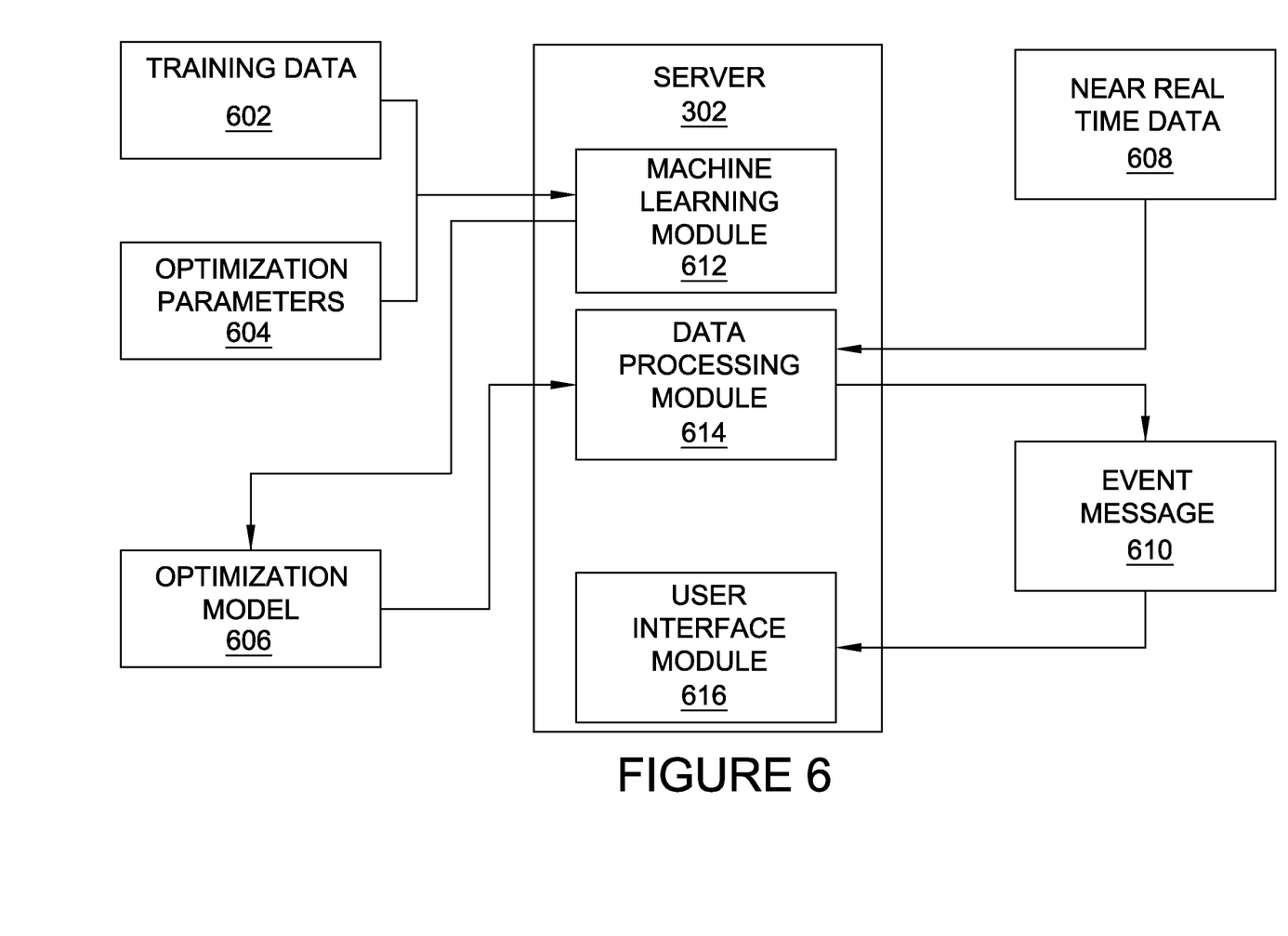
FIG. 6 is a flow diagram illustrating an exemplary machine learning configuration to implement the process of FIG. 1.

FIG. 6 is a flow diagram illustrating an exemplary machine learning configuration to implement process 200 (shown in FIG. 2) of proactively creating opportunity gain for a user. In the exemplary embodiment, server 302 may include a machine learning module 612, data processing module 614, and user interface module 616. In one embodiment, modules 612, 614, and 616 include software subroutines, where processor 326 (shown in FIG. 5) may process tasks associated with any software module. In certain embodiments, machine learning module 612 may be implemented using a machine learning co-processor in communication with processor 326. For example, machine learning module 612 may include a graphics processing unit in a general-purpose computing on graphics processing units ("GPGPU") configuration.

Machine learning module 612 may be configured to receive training data 602 and optimization parameters 604. Training data 602 may include any combination of structured (e.g., database records, JSON data, XML data) and unstructured data (e.g., plaintext). For example, training data 602 may include both database records and plaintext. In the exemplary embodiment, training data 602 may include any combination of financial transaction data, location data, motion data, biometric data, and the like. Training data 602 may include payment transactions having an amount and a location identifier. Additionally or alternatively, training data 602 may include location data generated by a mobile device.

In certain embodiments, training data 602 may include geofence data, indicating a time when a mobile device entered/exited a geographic area. Location data may include a time when a user left their home, and/or a time when a user arrived at work. For example, training data 602 may include data associated with a user routine, including personal commodity activities. In the exemplary embodiment, training data 602 may include at least a personal commodity amount.

Optimization parameters 604 define a type of value within training data 602 to be optimized. In the exemplary embodiment, server 302 generates optimization parameters 604 based upon a personal enrichment goal received and/or defined by a user. For example, optimization parameters 604 may include maximizing a personal commodity amount (e.g., account balance) based upon personal commodity data included in training data 602. In another embodiment, optimization parameters 604 may include minimizing transit time. More specifically, optimization parameters 604 may include minimizing a time between leaving a home geofence area and entering a work geofence area. In yet another embodiment, optimization parameters 604 may include minimizing an average daily heart rate, based upon biometric data.

Machine learning module 612 may be configured to generate an optimization model 606, based upon iteratively reducing training data 602 to identify patterns in training data 602 associated with changes in the optimization parameters 604 (e.g., account balance, transit time, heart rate). For example, machine learning module 612 may be configured to iteratively filter training data 602 to identify the most significant data points associated with optimization parameters 604. Machine learning module 612 may determine that geofence arrival/departure data associated with a work address is not associated with an account balance (e.g., optimization parameters 604).

Further, machine learning module 612 may determine, through iterative filtering, that a home geofence departure time is strongly correlated with an increased account balance. In other words, machine learning module 612 may be configured to determine a subset of training data 602 that is correlated with optimization parameters 604. For example, machine learning module 612 may identify activities associated with changes in a personal commodity amount.

Machine learning module 612 may also be configured to generate an optimization model 606 based upon the subset of training data 602 determined to be associated with optimization parameters 604. In other words, machine learning module 612 may generate any number of rules configured to predict the relationship between incoming data (e.g., training data, near real time data) and an effect on the optimization parameters 604 (e.g., a personal commodity amount).

In one embodiment, machine learning module 612 identifies that days having an above average decrease in an account balance (e.g., personal commodity) are associated with location data indicating home geofence departures after 8:30 am. Based upon this data, machine learning module 612 may generate optimization model 606 including a rule defining home geofence departures after 8:30 am are associated with a decrease in an account balance.

In another embodiment, machine learning module 612 may identify a below average daily heart rate (e.g., optimization parameter) is associated with a work geofence departure after 7:00 pm. Similarly, based upon this identification, machine learning module 612 may generate optimization model 606 to include a rule defining that leaving work after 7:00 pm is associated with a reduced heart rate, indicating less exercise. Optimization model 606 may include any combination of rules, training data, and optimization parameters. Server 302 may be configured to store optimization model 606.

Data processing module 614 may be configured to receive near real time ("NRT") data 608 and retrieve optimization model 606. In the exemplary embodiment, near real time data 608 may include data associated with a user routine, and further include activities having a personal commodity amount. For example, NRT data 608 may include payment card transaction data, location data, geofence data, motion/acceleration data, biometric data, and the like. NRT data 608 may include the same types of data as training data 602, but NRT data 608 may be received by data processing module 614 within a relatively short window of time (e.g., 30 seconds, 5 minutes) after generation.

In other words, data processing module 614 may be configured to monitor data associated with a user routine. For example, location data may be received by data processing module 614 within 30 seconds. As another example, biometric data including a heart rate may be received within 5 minutes of a reading being taken.

Data processing module 614 applies NRT data 608 to optimization model 606. For example, data processing module 614 may determine if any rules included in optimization model 606 are satisfied by NRT data 608. In certain embodiments, data processing module 614 may aggregate and/or convert near real time data 608. For example, data processing module 614 may determine a home departure time based upon location data. In another example, data processing module 614 may determine a daily transaction volume based upon aggregating individual payment transactions. In yet another example, data processing module 614 may determine an average transaction amount.

Data processing module 614 may be configured to generate events based upon determining NRT data 608 satisfies at least one rule included in optimization model 606. In some embodiments, where optimization model 606 may include rules based upon location data, data processing module 614 may generate an event message in response to receiving NRT data 608. In one embodiment, optimization model 606 includes a rule defining that leaving the office geofence area during work hours is associated with a decreased account balance (e.g., optimization parameter). Data processing module 614 may generate event message 610 in response to an office geofence exit indicator included in NRT data 608. In other words, after receiving an indicator that the user is leaving the office around noon, data processing module 614 may use optimization model 606 to determine a decreased account balance is likely, and generate an event message 610.

Data processing module may be configured to transmit event message 610 to user interface module 616. In the exemplary embodiment, user interface module 616 is a component of server 302, such as a web server. In another embodiment, user interface module 616 is a component of user computing device 304 (as shown in FIG. 3), such as a mobile application. In yet other embodiments, event message 610 may be transmitted to user computing device 304, such as via a text message.

In the exemplary embodiment, user interface module 616 may generate a visualization of event message 610. In other embodiments, user interface module 616 may only transmit a notification (e.g., SMS message, email). For example, user interface module 616 may generate a chart visualization illustrating a potential change in an account balance based upon optimization model 606. Other types of artificial intelligence or machine learning algorithms, programs, ana- Exemplary Embodiments In one aspect, a computer-implemented method of utilizing opportunity gain for personal enrichment of a user may be provided. The method may include, via one or more processors, servers, and/or associated transceivers: (1) receiving (such as via wireless communication or data transmission send from a customer mobile device over one or more radio links or communication channels) a selection of at least one personal enrichment goal, wherein the at least one personal enrichment goal is achieved as a function of an amount of money dedicated to the at least one personal enrichment goal; (2) monitoring a routine of the user, wherein the routine includes an activity (such as a daily commute, dining or restaurant habits, shopping habits, disposal income spending habits, etc.), and wherein a first amount of money is used when the user performs the activity; (3) determining an average amount of money used to perform the activity in the past; (4) determining an excess amount of money generated when the user deviates from the routine, wherein the excess amount of money is determined as a function of the average amount and the first amount of money; and/or (5) notifying (such as via wireless communication or data transmission sent to a customer mobile device over one or more radio links or communication channels) the user that the excess amount of money may be applied to achievement of the at least one personal enrichment goal. The method may include additional, less, or alternate actions, including those discussed elsewhere herein.

In another aspect, a computer-implemented method of proactively creating opportunity gain for a user may be provided. The method may include, via one or more processors and/or associated transceivers: (1) monitoring a routine of the user, wherein the routine includes a first activity (such as a daily commute, shopping habits, eating habits, spending habits, etc.), and wherein a first amount of money is used when the user performs the first activity; (2) determining an average amount of money used to perform the first activity in the past; (3) determining a deficit amount of money if the user adheres to the routine, wherein the deficit amount of money is determined as a function of the average amount and the first amount of money; and/or (4) providing a suggestion that the user deviate from the routine and perform a second activity at least one of before or instead of performing the first activity. The method may include additional, less, or alternate actions, including those discussed elsewhere herein.

In another aspect, a computer system for utilizing opportunity gain for personal enrichment of a user may be provided. The system may include a processor; and a non-transitory, tangible, computer-readable storage medium having instructions stored thereon that, in response to execution by the processor, cause the processor to perform operations comprising: receiving a selection of at least one personal enrichment goal, wherein the at least one personal enrichment goal is achieved as a function of an amount of money dedicated to the at least one personal enrichment goal; monitoring a routine of the user, wherein the routine includes an activity (such as a daily commute, travel activity, spending or shopping habits, etc.), and wherein a first amount of money is used when the user performs the activity; determining an average amount of money used to perform the activity in the past; determining an excess amount of money generated when the user deviates from the routine, wherein the excess amount of money is determined as a function of the average amount and the first amount of money; and/or notifying the user that the excess amount of money may be applied to achievement of the at least one personal enrichment goal. The system may include additional, less, or alternate functionality, including that discussed elsewhere herein.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A computer-implemented method of utilizing opportunity gain for personal enrichment of a user, the method implemented using a computing device having one or more processors, the method comprising:

receiving, by the one or more processors, a selection of at least one personal enrichment goal, wherein the at least one personal enrichment goal is achieved as a function of an amount of a personal commodity dedicated to the at least one personal enrichment goal;

monitoring a routine of the user, wherein the routine includes an activity, and wherein a first amount of the personal commodity is used when the user performs the activity;

determining, by the one or more processors, an average amount of the personal commodity used to perform the activity in the past;

determining an excess amount of the personal commodity generated when the user deviates from the routine, wherein the excess amount of the personal commodity is determined as a function of the average amount and the first amount of the personal commodity; and notifying, by the one or more processors, the user that the excess amount of the personal commodity may be applied to achievement of the at least one personal enrichment goal;

wherein determining an excess amount of the personal commodity generated comprises determining deviations from a planned activity using a machine-learning module of the one or more processors;

wherein the machine-learning module is configured to receive training data and optimization parameters that define a type of value within the training data and to generate an optimization model based upon iteratively reducing the training data to identify patterns in the training data associated with changes in the optimization parameters; and wherein the one or more processors includes a data processing module configured to generate at least one event based upon determining that near-real time data satisfies at least one rule included in the optimization model.

2. The computer-implemented method in accordance with claim 1, wherein determining an excess amount of the personal commodity comprises determining the excess amount based upon a difference between the average amount and the first amount of the personal commodity.

3. The computer-implemented method in accordance with claim 2 further comprising determining the difference between the average amount and the first amount of the personal commodity after completion of the activity.

4. The computer-implemented method in accordance with claim 1, wherein a saved amount of the personal commodity, equal to the first amount, is defined when the user abstains from the activity, wherein determining an excess amount of the personal commodity comprises determining the excess amount of the personal commodity based upon a difference between the average amount and the saved amount of the personal commodity.

5. The computer-implemented method in accordance with claim 4, wherein determining the excess amount of the personal commodity comprises comparing the average amount and the saved amount of the personal commodity at a predetermined interval.

6. The computer-implemented method in accordance with claim 1 further comprising providing means for achieving the at least one personal enrichment goal to the user using the excess amount of the personal commodity.

7. The computer-implemented method in accordance with claim 6, wherein providing means for achieving the at least one personal enrichment goal comprises launching, on a user device, an application configured to facilitate achievement of the at least one personal enrichment goal by the user.

8. The computer-implemented method in accordance with claim 7, wherein launching an application comprises launching the application configured to provide educational material to the user.

9. The computer-implemented method in accordance with claim 7, wherein the personal commodity is money, said method further comprising:

causing to be displayed, in the application, an excess amount of money generated by deviating from the activity, wherein the application is linked to a bank account and a deposit account associated with the user; and receiving, via the application, authorization to transfer the excess amount of money from the bank account to the deposit account.

10. The computer-implemented method in accordance with claim 7 further comprising:
   causing to be, in the application, a user-selectable link to a third party site configured to offer at least one of a product and a service associated with the at least one personal enrichment goal; and
   receiving a selection of the user-selectable link such that the user is redirected to the third party site.

11. The computer-implemented method in accordance with claim 7 further comprising utilizing machine-learning technology to offer, in the application, at least one of a product and a service tailored to the user and associated with the at least one personal enrichment goal.

12. The computer-implemented method in accordance with claim 1, wherein notifying the user comprises displaying, on a user device by the one or more processors, a graphical representation of the excess amount of the personal commodity.

13. The computer-implemented method in accordance with claim 1, wherein monitoring a routine of the user comprises monitoring a commute of the user from a first destination to a second destination, wherein the personal commodity is time.

14. The computer-implemented method in accordance with claim 13, wherein monitoring a commute of the user comprises accessing global positioning system (GPS) data associated with a user device.

15. The computer-implemented method in accordance with claim 1, wherein monitoring a routine of the user comprises monitoring spending habits of the user, wherein the personal commodity is money.

16. The computer-implemented method in accordance with claim 15, wherein monitoring spending habits of the user comprises accessing financial transaction data from at least one of a bank account and a credit card account associated with the user.

17. The computer-implemented method in accordance with claim 1, wherein the at least one personal enrichment goal includes at least one of gaining knowledge and saving money.

18. A computer system for utilizing opportunity gain for personal enrichment of a user, the computer system comprising:
   a processor; and
   a non-transitory, tangible, computer-readable storage medium having instructions stored thereon that, in response to execution by the processor, cause the processor to perform operations comprising:
      receiving a selection of at least one personal enrichment goal, wherein the at least one personal enrichment goal is achieved as a function of an amount of a personal commodity dedicated to the at least one personal enrichment goal;
      monitoring a routine of the user, wherein the routine includes an activity, and wherein a first amount of the personal commodity is used when the user performs the activity;
      determining an average amount of the personal commodity used to perform the activity in the past;
      determining an excess amount of the personal commodity generated when the user deviates from the routine, wherein the excess amount of the personal commodity is determined as a function of the average amount and the first amount of the personal commodity; and
   notifying the user that the excess amount of the personal commodity may be applied to achievement of the at least one personal enrichment goal;
   wherein determining an excess amount of the personal commodity generated comprises determining deviations from a planned activity using a machine-learning module of the processor;
   wherein the machine-learning module is configured to receive training data and optimization parameters that define a type of value within the training data and to generate an optimization model based upon iteratively reducing the training data to identify patterns in the training data associated with changes in the optimization parameters; and
   wherein the processor includes a data processing module configured to generate at least one event based upon determining that near-real time data satisfies at least one rule included in the optimization model.

* * * * *